(12) United States Patent
Schindler

(10) Patent No.: US 6,817,890 B1
(45) Date of Patent: Nov. 16, 2004

(54) SYSTEM AND METHOD FOR PROVIDING INDICATORS WITHIN A CONNECTOR ASSEMBLY

(75) Inventor: Frederick R. Schindler, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 10/430,513

(22) Filed: May 6, 2003

(51) Int. Cl.[7] .................................................. H01R 3/00
(52) U.S. Cl. .................................. 439/490; 439/676
(58) Field of Search ................................ 439/490, 676, 439/541.5, 620, 76.1

(56) References Cited

U.S. PATENT DOCUMENTS

| | | | |
|---|---|---|---|
| 6,099,349 A | 8/2000 | Boutros | 439/541.5 |
| 6,428,361 B1 | 8/2002 | Imschweiler et al. | 439/676 |
| 6,554,638 B1 | 4/2003 | Hess et al. | 439/490 |
| 6,655,988 B1 * | 12/2003 | Simmons et al. | 439/541.5 |
| 6,688,909 B1 * | 2/2004 | Espenshade et al. | 439/490 |
| 6,699,065 B1 * | 3/2004 | Espenshade et al. | 439/490 |

OTHER PUBLICATIONS

"Integrated Connector Modules Gigabit belStack™ with LEDs", Bel Fuse Inc., Oct., 2002.

* cited by examiner

*Primary Examiner*—Gary Pauman
(74) *Attorney, Agent, or Firm*—Baker Botts L.L.P.

(57) ABSTRACT

A connector assembly includes an enclosure being coupled with a motherboard of a communication device. A printed circuit board having communication circuitry thereupon may be coupled with the motherboard. A secondary processor being coupled with the printed circuit board is operable to communicate with a primary processor that is coupled with the motherboard, using the communication circuitry. A communication bus may be coupled with the secondary processor. A plurality of LED drivers are coupled with the printed circuit board, and each is coupled for communication with the secondary processor using the communication bus. In accordance with a particular embodiment of the present invention, each of the plurality of LED drivers may be operable to drive a respective one of a plurality of LEDs. In this embodiment, each of the plurality of LEDs may also be operable to indicate a status of an associated one of a plurality of communication connectors that are disposed at least partially within the enclosure.

15 Claims, 2 Drawing Sheets

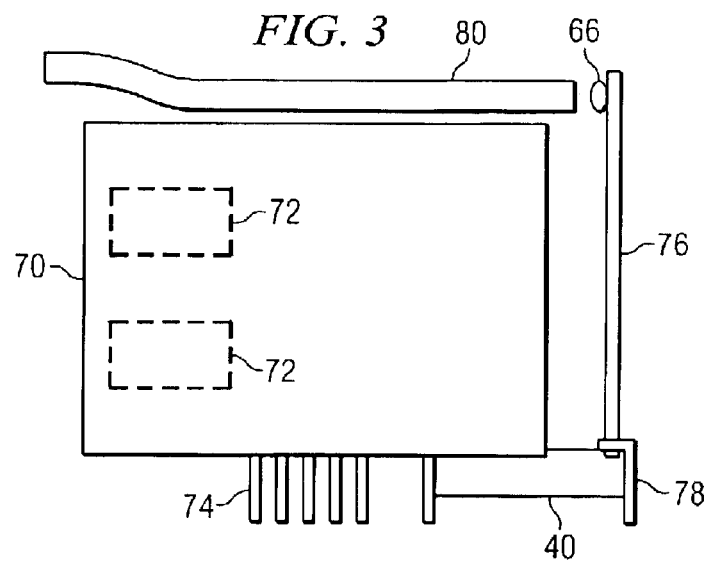
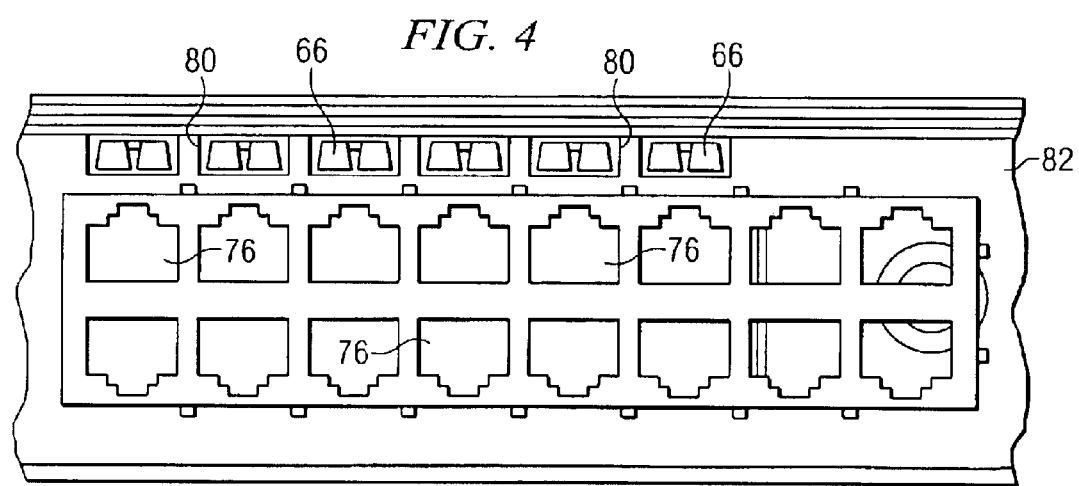

SYSTEM AND METHOD FOR PROVIDING INDICATORS WITHIN A CONNECTOR ASSEMBLY

TECHNICAL FIELD OF THE INVENTION

The present invention relates in general to the field of network communications and, more particularly, to a system and method for providing indicators within a connector assembly.

BACKGROUND OF THE INVENTION

A network typically includes a group of devices that communicate back and forth using a set of rules or a set of protocols (referred to as a protocol stack in data communications). The medium that the devices communicate through can be copper wire (UTP), fiber optic, coax, air/vacuum (radio), or light (infrared). The combination of software and hardware types that form the network may be referred to as a network architecture. Each network architecture can have one or more protocols within it. For example, a family of local area network (LAN) protocols is Ethernet. Ethernet is one of the oldest communication protocols for personal computers, and refers to the physical topology and the protocol the LAN uses to manage communication between devices.

In an Ethernet LAN, computers are given a means to communicate with each other called a protocol. A protocol is a set of rules and instructions for communicating between devices. Typically, a particular type of hardware and software configuration is used within each network device, to allow the device to send and/or receive communications using the Ethernet protocol. For example, one or more of the network devices may be equipped with an Ethernet connector.

Connector assemblies are often coupled with or integrated with a communication device of the network. A connector assembly often has several Ethernet connectors, or jacks, that allow the coupling for communication of the device with one or more other devices of the network. The connector assembly and/or the individual connectors may be coupled for communication with a printed circuit board (PCB) of the communication device, so that the communication device may plug into the connector. Often times additional components are included within the connectors assembly. For example, isolation transformers for the data lines may be included in the housing of the connector assembly. The pins of the connector assembly and/or Ethernet connectors may be soldered onto the PCB to electrically couple the data components in the housing of the connector assembly and/or individual Ethernet connectors, to other components that are coupled with and/or connected to the PCB.

In many communication devices, each Ethernet connector is electrically coupled with a central processing unit (CPU) of the communication device. This is frequently done by running an embedded wire, or trace, from each connector to the central processing unit. Furthermore, each connector may receive and/or distribute power from a power source that is coupled with the PCB. Providing power to the connector is typically referred to as "in-line" power. Again, this typically involves running one or more electrical leads or traces from each connector, to one or more power sources that are coupled with the PCB.

PCB design requires that the quantity, quality, and performance characteristics of each trace be taken into account when designing any particular computing device. In order to allow proper functionality, traces must be spaced, and sometimes isolated from one another within the printed circuit board. This may require several layers of printed circuit board and associated circuitry, in order to add certain components or functionality to the system. The design of the PCB and its associated circuitry is a complicated procedure that requires substantial time and resources of a designer, or design team. Furthermore, the "real estate" of the printed circuit board is at a premium, since larger printed circuit boards and larger quantities of integrated circuitry increases design and material costs.

Many current designs require that multiple driver chips, light pipes and LEDs be provided on the main printed circuit board of a communication device, to provide status indicators for the connectors. Many such components, particularly the light pipes, are unique to a specific product and require a re-design each time the product or layout is changed. Furthermore, such components are typically managed and controlled almost exclusively by the central processing unit of the main printed circuit board.

SUMMARY OF THE INVENTION

The present invention includes a system and method for providing indicators within a connector assembly that substantially eliminates or reduces the disadvantages or problems associated with previously developed systems and methods. In particular, the present invention contemplates a connector assembly equipped with a secondary processor that controls, at least in part, the operation of a plurality of light-emitting diodes (LEDs) indicators associated with the Ethernet connectors. Accordingly, the components required to provide an indicator within a connector are integrated, and provide connections for a serial bus to a plurality of LED drivers.

In accordance with a particular embodiment of the present invention, a connector assembly includes an enclosure being coupled with a motherboard of a communication device. A printed circuit board having communication circuitry thereupon may be coupled with the motherboard. A secondary processor being coupled with the printed circuit board is operable to communicate with a primary processor that is coupled with the motherboard, using the communication circuitry. A communication bus may be coupled with the secondary processor. A plurality of LED drivers are coupled with the printed circuit board, and each is coupled for communication with the secondary processor using the communication bus. In accordance with a particular embodiment of the present invention, each of the plurality of LED drivers may be operable to drive a respective one of a plurality of LEDs. In this embodiment, each of the plurality of LEDs may also be operable to indicate a status of an associated one of a plurality of communication connectors that are disposed at least partially within the enclosure.

Technical advantages of particular embodiments of the present invention allow Ethernet port LEDs, and their associated drivers to be incorporated within a connector assembly. In this manner, the control bus that is used for switching these indicators on, off, or among various blink rates, can be shared with other integrated electronics associated with the computing device. This reduces the number of connections required and simplifies manufacturing of the system because separate light pipes, and additional space on the PCB are not required for such components.

Another technical advantage of particular embodiments of the present invention includes a method for providing indicators within a connector in which many of the associated components are removed from the main printed circuit board (e.g., system board, or motherboard) and reduces the size of the light pipes required. Accordingly, the size of the motherboard may be reduced and/or additional area is provided on the motherboard for signal traces for other components. Additionally, time, resources, and costs required for main PCB design and/or manufacturing are reduced.

Another technical advantage of particular embodiments of the present invention includes a method for providing indicators within a connector assembly in which the same connector configuration may be used for various different products. This reduces engineering and manufacturing costs, as well as inventory management.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following descriptions, taken in conjunction with the accompanying drawings, in which:

FIG. 3 illustrates a cross sectional side view, with portions broken away, of a connector assembly, in accordance with a particular embodiment of the present invention; and FIG. 4 illustrates a front view, with portions broken away, of a communications device that incorporates aspects of the present invention.

DETAILED DESCRIPTION OF THE INVENTION

Embodiments of the invention are best understood by referring to FIGS. 1 through 4 of the drawings, like numerals being used for like and corresponding parts of the various drawings.

Figure 1:
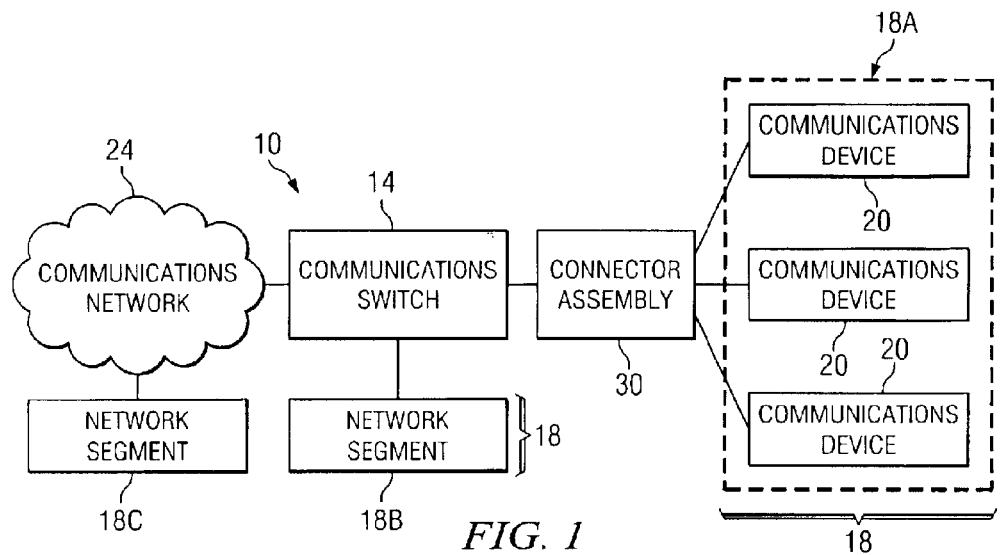
FIG. 1 illustrates a communications network having a switch therein that incorporates aspects of the present invention.

FIG. 1 is a schematic diagram illustrating one embodiment of a communications system 10 that may benefit from the teachings of the present invention. System 10 comprises network segments 18A through 18C that are coupled to each other over a communications network 24 and/or a communications switch 14. Network segments 18A through 18C are jointly referred to as network segments 18. As shown in FIG. 1, network segment 18A is coupled to network segment 18B over communications switch 14. Network segment 18C is coupled to network segments 18A and 18B over communications network 24 and communications switch 14. More or fewer network segments 18 may be coupled to each other over communications network 24 and communications switch 14.

Network segments 18A through 18C each comprises one or more communications devices 20. A connector assembly 30 is coupled to communications switch 14 to provide one or more ports that may be used to physically connect communications devices 20. For example, a cable having plugs may be used to plug in communications devices 20 to connector assembly 30. In some embodiments, switch 14 and network segments 18 may be devices that are capable of operating according to the Ethernet network standard. Although connector assembly 30 is logically illustrated as a separate component from communications switch 14 and communication devices 20, it should be recognized that one or more connector assemblies may be integral to one or more switches and/or other communication devices, within the teachings of the present invention.

In accordance with aspects of the present invention, connector assembly 30 integrates components that are used to provide status indicators for connector assembly 30 and its associated ports. For example, Ethernet port LEDs and their associated drivers and/or circuits may be incorporated within connector assembly 30. Moreover, a control bus may be provided for actuating and controlling the port LEDs and their associated drivers. The control bus may be shared amongst the LED drivers, and other integrated electronic components. This reduces the number of connections required of prior systems and components. Furthermore, design and manufacturing of the system is simplified because separate light pipes and dedicated space needed on the main PCB is reduced or eliminated. Various devices and components that may be integrated with or coupled to connector assembly 30 will be described later in more detail.

Communications switch 14 may be operable to send and receive packets to and from communications devices 20 according to the addresses of the packets. Upon receiving one or more packets from device 20, switch 14 sends the received packets to a particular communications device 20 that is identified by the included address. Switch 14 may send and receive the packets over network 24, connector assembly 30, or any other suitable conduit or a combination of conduits that couples switch 14 to communications devices 20. In some examples, a hub, a router, or any other suitable device may be used instead of switch 14. Communications device 20 may be any communications device that is operable to communicate with other communications devices over a network architecture. Examples of communications device 20 include a Voice over Internet Protocol ("VoIP") phone and a computer.

Connector assembly 30 may comprise one or more RJ-45 jacks; however, jack unit 30 may comprise any one of many other types of jacks (e.g., GBIC, or SFP (small form-factor pluggable). Where connector assembly 30 comprises RJ-45 jacks, communications devices 20 may plug into connector assembly 30 using cables having plugs that are adaptable to a RJ-45 jack. If connector assembly 30 is configured to receive in-line power, it may also comprise one or more isolation transformers within its housing. A jack unit having isolation transformers within its housing is referred to as a "mag jack." An isolation transformer is a transformer that is operable to protect the components of switch 14, such as integrated circuit chips, against excessive common mode voltages from communications devices 20 and/or cables attaching devices 20 to switch 14.

Connector assembly 30 generally includes outwardly disposed pins that may be soldered onto the appropriate apertures of a primary, or main printed circuit board of communications switch 14, thereby electrically coupling the components of connector assembly 30 to the components of communications switch 14. The use of a mag jack also saves space on the main printed circuit board ("PCB") of switch 14 because the isolation transformers are in the mag jack rather than on the PCB.

To send and receive packets from switch 14, communications device 20 may establish a physical connection with switch 14. To that end, communications device 20 may plug into connector assembly 30. Along with a physical connection to switch 14, communications device 20 may also require access to power in order to send and receive packets to and from switch 14. Power may be provided to communications device 20 in a variety of ways. For example, alternating current ("AC") power may be provided to communications device 20 by plugging communications device 20 into a wall socket. In another example, communications device 20 may receive direct current ("DC") power from a battery pack. Power may also be provided inline, which refers to transmitting power from switch 14 to communications device 20 over a jack unit of connector assembly 30 and the physical cable that plugs into the jack unit. One advantage of providing inline power to communications device 20 is that it eliminates the need to provide a separate power source for device 20 at the physical location of device 20. Providing inline power also simplifies the design and configuration of communications device 20. Inline power may be provided for the mag jack by positioning a power controller within connector assembly 30.

In a particular embodiment of the invention, a power controller that controls inline power is positioned in connector assembly 30 along with one or more isolation transformers. In another embodiment, a power converter that supplies the inline power is also positioned in connector assembly 30. Because the power controller is in the housing of connector assembly 30, inline power may be injected into the jack side of the isolation transformer to provide inline power for the jacks of connector assembly 30. A mag jack having a power controller in its housing is referred to as an "integrated inline power mag jack" or a "power mag jack."

Figure 2:
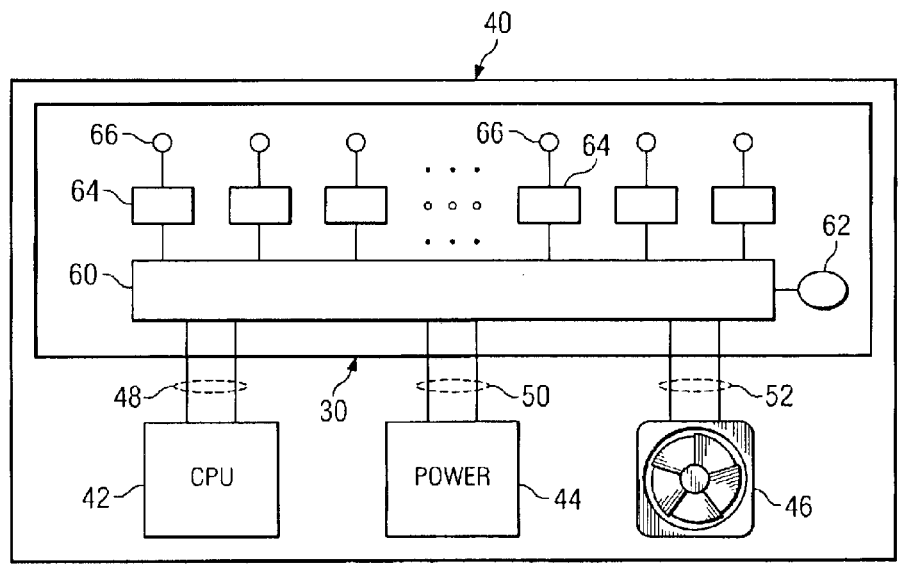
FIG. 2 illustrates a sample layout for particular components of the switch of FIG. 1.

FIG. 2 is a schematic diagram illustrating components of a switch 14, including connector assembly 30, in accordance with a particular embodiment of the present invention. Switch 14 includes a printed circuit board 40. Printed circuit board 40 may be referred to as the "primary" or "main" circuit board of switch 14, since many basic components of switch 14 are coupled with and/or affixed to printed circuit board 40. Accordingly, such printed circuit boards are commonly referred to as the "motherboard" of switch 14. For example, a processor 42, power supply 44 and fan 46 may be coupled with printed circuit board 40, in accordance with a particular embodiment of the present invention.

Processor 42 may be referred to as the "primary", or "main" processor of switch 14, since many of the core logic and/or calculations of switch 14 are performed by processor 42. For this reason, such a processor may also be referred to as the "central processing unit" ("CPU") of switch 14.

It should be recognized by those of ordinary skill in the art that switch 14 includes many additional components that will not be illustrated or described herein (e.g., switching fabric, memory storage, etc.). Instead, those components that are addressed in this specification are selected to provide an example of the function and benefit of the teachings of the present invention, and to provide specific examples of how the overall communication device is enhanced by the improvements described and illustrated herein.

In practice, the motherboard of a communication device includes embedded circuitry and components that accommodate at least some of the features and functionality of switch 14. In order to provide appropriate tolerances, and distances between components, to avoid interference between the various components, the motherboard is typically formed of several different layers, each of which includes circuitry to interconnect components on the surface of the main PCB. As the design of the communication device becomes more complex, and additional demand and/or load is anticipated for the communication device, the "real estate" upon printed circuit board 40 becomes more valuable. In this manner, any steps that are taken to save space upon the motherboard, and/or relieve one or more components (e.g., a central processing unit) from performing additional functions, can be invaluable to the design of switch 14. Various particular embodiments of the present invention accomplish some or all of these goals.

A pair of wire traces 48 are illustrated in FIG. 2, as forming a path of communication between CPU 42 and connector assembly 30. Two wire traces are illustrated to denote a two-way path of communication between CPU 42 and connector assembly 30. Accordingly, information may be transmitted from CPU 42 and received by connector assembly 30; information may also be transmitted from connector assembly 30 to CPU 42. An additional "common" or "ground" trace is also provided, although it is not illustrated herein, for purposes of clarity. It should be recognized by those of ordinary skill in the art that a single trace may be used to form the path of communication between CPU 42 and connector assembly 30, particularly if only a one way path of communication is desired. Furthermore, many additional traces may be used to form the path of communication, or communication bus, between CPU 40 and connector assembly 30, within the teachings of the present invention.

In the illustrated embodiment, it is contemplated that traces 48 will be connected to Universal Asynchronous Receiver/Transmitter circuit, for communication between connector assembly 30 and CPU 42. However, other communication techniques, including $I^2c$ or SPI, may be used for such communication.

Two additional wire traces 50 are illustrated as forming an electrical coupling between power source 44 and connector assembly 30. In the illustrated embodiment, two wire traces are illustrated to denote that power and communication signals are transmitted between power source 44 and connector assembly 30. It should be recognized by those of ordinary skill in the art that many additional wire traces may be used to couple these components. For example, multiple power sources may be provided for the distribution of AC and/or DC power from power source 44 to connector assembly 30. Such power sources may each have one or more dedicated paths from power source 44 to connector assembly 30.

Additional wire traces may also be provided to increase the power and/or voltages transferred between power source 44 and connector assembly 30. In the illustrated embodiment, it is contemplated that one-way communication will be provided such that power source 44 may power the connector assembly 30. However, two-way power transfer and practically any number of additional traces may be provided within the teaching of the present invention. For example, power source 44 may also provide status to the connector using a communication bus.

A pair of wire traces 52 is shown coupling fan 46 and connector assembly 30, for two-way communication (ground is not shown). As will be described later in more detail, fan 46 may be configured to communicate information about its operation to connector assembly 30, and connector assembly 30 may be configured to communicate control signals to fan 46, in order to control its operation. Any number of additional traces may also be provided to enhance communication between fan 46 and connector assembly 30, within the teachings of the present invention.

Motherboard 40 also includes a number of additional components, layers, embedded circuitry and/or wire traces that are common to computing and communication devices, that are not shown here for purposes of clarity. For example, it is contemplated that most, if not all of the components will have the ability to communicate either directly or indirectly with CPU 42. As an example, not all embedded circuitry or wire traces are illustrated that show a direct path of communication from fan 46 to CPU 42, although such a path may be provided. In the illustrated embodiment, it is contemplated that CPU 42 will communicate high level instructions to secondary processor 62 (FIG. 2) and secondary processor 62 will control the fan(s) as instructed.

FIG. 2 illustrates additional components associated with connector assembly 30, in accordance with aspects of the present invention. It should be recognized that each of the components that are illustrated as logically associated with connector assembly 30 may not be physically connected to enclosure 70 (see FIG. 3). Furthermore, not all such components will necessarily be enclosed within housing 70 of connector assembly 30. One physical layout of such components will be described later in more detail although many such configurations are possible within the teachings of the present invention. The logical association of such components in FIG. 2 is provided to denote the interaction of such components to accommodate aspects of the present invention.

Connector assembly 30 includes a communication bus 60, that manages communication between connector assembly 30, and components of connector assembly 30, between each other and/or other components that are coupled with motherboard 40 and/or other components integral with or coupled to switch 14. Communication bus 60 may be a "low-speed" bus in accordance with aspects of the present invention, although other designs may be implemented having a high-speed bus, if desired.

Communication bus 60 is also coupled with a secondary processor 62. Secondary processor 62 is distinguished from the primary processor, or CPU 42 because it's used to manage aspects of connector assembly 30, and not the overall operation of switch 14. Secondary processor 62 provides intelligence to connector assembly 30, and allows a mechanism by which the operation of connector assembly 30 and its associated components can be controlled and/or managed at least partially independent from CPU 42.

Communication bus 60 is also coupled for communication with a plurality of LED drivers 64, each of which is used to control the operation of a corresponding LED 66. In this manner, secondary processor 62 may be used to control the operation of LED drivers 64 and LEDs 66. Such operation includes on, off, various blink rates, and may include different colors to indicate that an associated port, or connector of connector assembly 30 is in one of various possible "states" (e.g., states that denote the status of the connector). Such states may be used to indicate that the port is or is not coupled with a device, is or is not receiving information from the device, is or is not transmitting information to the device, is or is not functioning properly, is or is not receiving power from a power supply, etc.

In accordance with aspects of the present invention, additional components may be integral to, or coupled with connector assembly 30. It is contemplated that many of these components may share the resources that are available from communication bus 60 and/or secondary processor 62. For example, where in-line power is provided to the ports of connector assembly 30, a power controller associated with each connector may share communication bus 60, for communications between and amongst themselves, secondary processor 62 and/or other components of connector assembly 30 and/or switch 14. However, instead of using bus 60, a dedicated bus may be used just for the power controller (typically provided by the secondary processor). Each port that receives inline power may also include other components including power converters, switches, transformers, etc. In general, it is contemplated that the primary CPU will communicate high-level instructions to the secondary processor, and the secondary processor will work autonomously to accomplish these instructions. This will typically involve the secondary processor communicating directly with the power controllers and other support circuitry.

FIG. 3 illustrates a physical layout of connector assembly 30 and its associated components, in accordance with a particular embodiment of the present invention. FIG. 4 illustrates a rear view of switch 14, with portions broken away, to show a sample layout of ports 76 and LEDs 66. FIGS. 3 and 4 will be described in combination, herein. Connector assembly 30 includes a plurality of communication ports, or connectors 72, each of which is at least partially disposed within housing 70 of connector assembly 30. Communication ports or connectors may also be referred to as "jacks." For the purposes of this specification, it is contemplated that any given connector assembly will include a plurality of such communication ports. Each port 72 provides a physical point at which switch 14 may be coupled with one or more additional components of the communication network. Accordingly, each port 72 is configured to receive a physical connector that is used to communicate information between devices.

Communication signals that are received at a port 72 are communicated to motherboard 40 using a plurality of pins 74. Pins 74 form the connection between connector assembly 30 and motherboard 40. In accordance with a particular embodiment of the present invention, pins 74 may be soldered to motherboard 40, although other techniques for coupling these components are contemplated within the teachings of the present invention.

A secondary printed circuit board 76 is coupled with motherboard 40, using an additional soldered pin 78. Secondary printed circuit board is referred to as "secondary" to distinguish it from the primary motherboard 40 of device 20. Secondary printed circuit board 76 may be referred to as a "daughter card" that can be coupled with (or decoupled from) motherboard 40, as desired by the user. Secondary printed circuit board 76 may include one or two layers and/or components, although many more may be provided within the teachings of the present invention. Motherboard 40, may include as many as sixteen or more layers, within the teachings of the present invention.

One advantage of particular embodiments of the present invention is the intelligence (e.g., processor 62) that is incorporated into connector assembly 30, within the teachings of the present invention. In this manner, processor 62 is able to remove some of the processing load that would otherwise be placed upon CPU 42. Accordingly, and since secondary printed circuit board 76 may be installed or removed at any time, the features and functionality provided by secondary printed circuit board 76 are essentially modular, and the amount of resources required to be accounted for regarding other components of switch 14 (e.g., CPU 42, and motherboard 40) during design are substantially reduced. It is contemplated that secondary printed circuit board 76 will include secondary processor 62, communication bus 60, LED drivers 64 and LEDs 66, and may include additional components, embedded circuitry, etc. Of these components, only a single LED is visible from the side view cross-section of secondary printed circuit board 76, of FIG. 3.

The sharing of components of secondary printed circuit board 76 with other components can enhance the features and functions available to switch 14. For example, secondary processor 62 and communication bus can be shared by such components, to further alleviate the processing load upon CPU 42 and the embedded circuitry required of motherboard 40. Such sharing of secondary processor 62, communication bus 60 and/or other components of connector assembly 30 allows the costs of the secondary processor 62 and communication bus 60 to be amortized among other components (e.g., by adding functions to the control of secondary processor 62).

In a particular embodiment of the present invention, fan 46 communicates with secondary processor 62 using communication bus 60 (in alternative embodiments, a dedicated bus may be used for communication between the fan and secondary processor). This allows secondary processor 62 to control the operation of fan 46. For example, if secondary processor 62 detects more than a certain number of "active" ports of connection assembly 30, secondary processor may cause fan 46 to actuate (in an alternative embodiment, the secondary processor may receive high level instructions regarding the operation of the tans from the CPU). Similarly, if fan 46 is a variable speed fan, secondary processor 62 may control the speed of the fan based upon the number of devices that are coupled with switch 14. In an alternative embodiment, secondary processor may be coupled with temperature sensor, and secondary processor may control the fan speed based upon the measured temperature.

Similarly, secondary processor 62 may be used to perform certain electrical design and verification testing upon components of switch 14. Such techniques include testing in which the timing of a clock may be delayed, or noise can be added to the system during development.

As is evident from FIG. 3, secondary printed circuit board 76 is not contained within housing 70. Nonetheless, secondary printed circuit board 76 is considered to be "associated" with connector assembly 30, and is illustrated herein as being logically associated with connector assembly 30, because of the manner in which it is used to manage and/or control the operation of indicators that are associated with ports 72 of connector assembly 30.

Secondary printed circuit board 76 is positioned adjacent to, and behind housing 70, and forms a right angle with motherboard 40 of device 20. This configuration allows the LED 66 to extend above housing 70, such that a light pipe 80 may be disposed adjacent to and above housing 70, and form a path for light that is emitted from LED 66, during operation. In this manner, light pipe 80 is external to housing 70 and does not interfere with, nor is it interfered by, any of the ports of connector assembly 30. The light that is emitted from LED 66, therefore, is more visible to a user who is viewing it from outside a bezel 82 of device 20. Such a bezel may be marked to indicate which port the light signal from the LED pertains to, and/or what various colors, blink rates, or on/off conditions refer to.

In an alternative embodiment, secondary printed circuit board 76 may be disposed on the sides of housing 70, or may be disposed at least partially within housing 70. An embodiment in which secondary printed circuit board 76 and many of its associated components are integrated within enclosure 70 will be discussed later in more detail It is presently contemplated that approximately four different blink rates will be provided to represent different "states" of any given connector, although more or fewer than four may be provided within the teachings of the present invention. Blink rates may be controlled by using multiple pins to couple a particular port to a respective driver, or by using voltage, such as an analog to digital converter.

In the illustrated embodiments of FIGS. 3 and 4, each of twelve ports 76 are provided with a single LED 66 to indicate a status of that particular port. Accordingly, each port and each LED includes an associate light pipe 80, and LED driver 64. It should be recognized by those of ordinary skill in the art that more than one LED may be dedicated to a single port, in order to increase the number of states that can be displayed to a user.

By removing components from motherboard 40 and placing them on secondary printed circuit board 76, the size of motherboard 40 may be reduced or additional traces and components needed to accomplish other functions of switch 14 may be provided upon a motherboard area normally used to support the functions of the teachings of the present invention. Furthermore, this configuration reduces the size of the light pipes required to transmit light from the LEDs, which reduces cost and saves space on or near the motherboard. This design also allows the same connector assembly to be used for different products and designs, which reduces engineering, manufacturing, and/or inventory management cost and resource expenditures.

This is in contrast to current solutions that integrate indicators within a port, and require separate power connections for each port LED integrated. Such a design increases the complexity of signal routing on a PCB, and leads to increases in PCB layers, and/or increased EMI and signal integrity degradation.

It should be recognized by those of ordinary skill in the art that many other configurations of connector assembly 30 may be used, within the teachings of the present invention. For example, although secondary printed circuit board 76 of the illustrated embodiment of FIG. 3 is disposed outside of housing 70, secondary printed circuit board 76 and some or all of its associated components (e.g., communication bus 60, secondary processor 62, LED drivers 64, LEDs 66, etc.) may be disposed within housing 70, such that connector assembly 30 is an integrated assembly that can be coupled or removed from motherboard 40 in "one-piece". Furthermore, it should be recognized by those of ordinary skill in the art that many of the components associated with connector assembly 30 may be integrated into one or more integrated circuits (e.g., secondary processor 62 and LED drivers 64 may be single integrated circuit).

The teachings of the present invention incorporate a current source to drive LEDs instead of a voltage source. Accordingly, fewer resistors are needed in the overall design of the device, since a voltage source would require a resistor for each LED, and a current source does not. Furthermore, the current source utilized within the teachings of the present invention ensure control of the voltage change across it during operation (e.g., edge controlled transition), which reduces EMI.

The teachings of the present invention reduce assembly cost, since many aspects are targeted to lower cost for supplies and manufacture. At the same time, area required of the main PCB is reduced. The secondary printed circuit board requires fewer layers and costs less to design and manufacture. Furthermore, design and components of the secondary printed circuit board are easier to optimize and change compared to changes implemented upon the motherboard. This permits lower cost suppliers to be used when they are available, and less material is used.

The metallic shell of connector assembly 30, and the use of the secondary PCB reduces noise coupling to the Ethernet cables and therefore, the EMI of the system is reduced. This apparatus also permits chip-on-board or other packaging technologies to be used.

Although various embodiments of the methods and apparatus of the present invention have been illustrated in the accompanying drawings and described in the foregoing detailed description, it will be understood that the invention is not limited to the embodiment disclosed, but is capable of numerous rearrangements, modifications, and substitutions without departing from the spirit of the invention as set forth and defined by the following claims.

What is claimed is:

1. A connector assembly, comprising:
   an enclosure being coupled with a motherboard of a communication device;
   a printed circuit board having communication circuitry thereupon, and being coupled with the motherboard;
   a secondary processor being coupled with the printed circuit board and being operable to communicate with a primary processor that is coupled with the motherboard, using the communication circuitry;
   a communication bus being coupled with the secondary processor;
   a plurality of LED drivers being coupled with the printed circuit board, each being coupled for communication with the secondary processor using the communication bus;
   each of the plurality of LED drivers being operable to drive a respective one of a plurality of LEDs; and
   each of the plurality of LEDs being operable to indicate a status of an associated one of a plurality of communication connectors that are disposed at least partially within the enclosure.

2. The connector assembly of claim 1, wherein each one of the communication connectors includes a plurality of communication pins that allow the one of the communication connectors to be coupled with circuitry of a motherboard, to allow communication between the primary CPU and a component being externally coupled with the one of the communication connectors.

3. The connector assembly of claim 1, wherein the communication bus communicates control signals between the secondary CPU and the plurality of LED drivers, to control states associated with the plurality of LED drivers.

4. The connector assembly of claim 1, wherein the communication bus communicates status information between the plurality of communication connectors and the secondary processor.

5. The connector assembly of claim 1, wherein each of the LED drivers is configured to be switchable between the control states of LED ON, and LED off.

6. The connector assembly of claim 5, wherein each of the LED drivers is configured to be further switchable between a plurality of blink rates associated with respective ones of states in which the communication connectors may be operating in.

7. The connector assembly of claim 1, further comprising a plurality of light pipes, wherein each light pipe is associated with a respective one of the LEDs and a respective one of the communication connectors, the light pipes extending from a location proximate the respective one of the LEDs to a location proximate the respective one of the communication connectors, such that light emitted from the respective one of the LEDs is visible from an exterior of the enclosure.

8. The connector assembly of claim 7, wherein each light pipe is disposed above the respective one of the communication connectors.

9. The connector assembly of claim 1, further comprising a plurality of light pipes each being associated with a respective one of the LEDs, each light pipe being disposed above the enclosure and being operable to transmit light from the respective one of the LEDs, to adjacent a bezel of the communication device.

10. The connector assembly of claim 9, wherein the light pipes extend from adjacent the respective one of the LEDs, to adjacent the bezel.

11. The connector assembly of claim 1, wherein the printed circuit board is disposed at an angle of approximately ninety degrees to the motherboard.

12. The connector assembly of claim 1, wherein the communication connectors comprise Ethernet connectors.

13. The connector assembly of claim 1, wherein the communication connectors comprise GBIC connectors.

14. The connector assembly of claim 1, wherein the communication bus comprises a serial bus.

15. The connector assembly of claim 1, wherein the communication circuitry comprises a two-wire bus and a common ground.

* * * * *

UNITED STATES PATENT AND TRADEMARK OFFICE
CERTIFICATE OF CORRECTION

PATENT NO. : 6,817,890 B1
DATED : November 16, 2004
INVENTOR(S) : Frederick R. Schindler It is certified that error appears in the above-identified patent and that said Letters Patent is hereby corrected as shown below:

<u>Title page,</u>
Item [56], References Cited, U.S. PATENT DOCUMENTS,
-- 5,790,041   08/1998   Lee              340   815.45
   6,756,911   06/2004   Striano, et al.  340   815.4
   6,246,334   06/2001   Saffarian        340   815.45
   6,020,824   02/2000   Tamura, et al.   340   815.5
   6,487,613   11/2002   Nguyen, et al.   710   15
   6,321,277   11/2001   Andresen, et al. 710   8 --.

Signed and Sealed this

Seventh Day of February, 2006

JON W. DUDAS
*Director of the United States Patent and Trademark Office*